United States Patent
Grgic (10) Patent No.: US 10,042,335 B2
(45) Date of Patent: Aug. 7, 2018

(54) EMBEDDED EMULATION MODULES IN INDUSTRIAL CONTROL DEVICES

(71) Applicant: Rockwell Automation Technologies, Inc., Mayfield, OH (US)

(72) Inventor: Richard J. Grgic, Painesville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 311 days.

(21) Appl. No.: 15/001,478

(22) Filed: Jan. 20, 2016

(65) Prior Publication Data

US 2017/0205780 A1 Jul. 20, 2017

(51) Int. Cl.
*G05B 13/04* (2006.01)
*G05B 15/02* (2006.01)

(52) U.S. Cl.
CPC .......... *G05B 13/041* (2013.01); *G05B 15/02* (2013.01)

(58) Field of Classification Search
CPC .............................. G05B 13/041; G05B 15/02
See application file for complete search history.

(56) References Cited

U.S. PATENT DOCUMENTS 9,734,063 B2 * 8/2017 Novakovic ......... G06F 12/0813
2002/0022939 A1 2/2002 Senta et al.

FOREIGN PATENT DOCUMENTS

EP 2711792 A2 3/2014

OTHER PUBLICATIONS

Extended European Search Report dated Jun. 6, 2017; Application No. 17151396.3—(9) pages.

* cited by examiner

*Primary Examiner* — Quoc Hoang
(74) *Attorney, Agent, or Firm* — Boyle Fredrickson, SC (57) ABSTRACT

An emulation module configured to model a logical behavior of an industrial control device may be stored or embedded in the industrial control device for subsequent downloading and emulation by another device. The industrial control device storing the emulation module may execute firmware for its operation, and the stored emulation module may be used to model the logical behavior of the industrial control device executing the firmware. The industrial control device storing the emulation module may provide the emulation module to another device using an industry standard bi-directional communication interface, such as an EtherNet/IP control network interface. The industrial control device may also store multiple emulation modules with identifiable revisions, and a revision of an emulation module may correspond to a revision of firmware for execution by the industrial control device.

20 Claims, 4 Drawing Sheets

EMBEDDED EMULATION MODULES IN INDUSTRIAL CONTROL DEVICES

FIELD OF THE INVENTION

The present invention relates to the field of industrial control, and more particularly, to emulation of industrial control devices and comparison to industrial control systems.

BACKGROUND OF THE INVENTION

Industrial controllers are specialized computer systems used for the control of industrial processes or machinery, for example, in a factory environment. Generally, an industrial controller executes a stored control program that reads inputs from a variety of sensors associated with the controlled process or machine and, sensing the conditions of the process or machine, and based on those inputs and a stored control program, calculates a set of outputs used to control actuators controlling the process or machine.

Industrial controllers differ from conventional computers in a number of ways. Physically, they are constructed to be substantially more robust against shock and damage and to better resist external contaminants and extreme environmental conditions than conventional computers. The processors and operating systems are optimized for real-time control and are programmed with languages designed to permit rapid development of control programs tailored to a constantly varying set of machine control or process control applications.

Generally, industrial controllers have a highly modular architecture, for example, that allows different numbers and types of input and output modules to be used to connect the controller to the process or machinery to be controlled. This modularity is facilitated through the use of special "control networks" suitable for highly reliable and available real-time communication. Such control networks (for example, EtherNet/IP, DeviceNet and ControlNet) differ from standard communication networks (such as Ethernet) by guaranteeing maximum communication delays by pre-scheduling the communication capacity of the network, and/or providing redundant communication capabilities for high-availability.

As part of their enhanced modularity, industrial controllers may employ I/O modules or devices dedicated to a particular type of electrical signal and function, for example, detecting input AC or DC signals or controlling output AC or DC signals. Each of these I/O modules or devices may have a connector system allowing them to be installed in different combinations in a housing or rack along with other selected I/O modules or devices to match the demands of the particular application. Multiple or individual I/O modules or devices may be located at convenient control points near the controlled process or machine to communicate with a central industrial controller via the control network.

Emulation of industrial control devices is often desirable for logic validation of such devices prior to commissioning. Emulation typically involves replicating the behavior of one or more hardware devices in a software emulation environment executed by a host. The emulation environment is intended to mimic the actual automation hardware as closely as possible. Accordingly, an industrial control system and control program may be tested and validated in a more cost effective virtual environment prior to implementation in an actual physical environment. However, once the industrial control system is implemented in the physical environment, maintaining emulation in the virtual environment may be time consuming and may require significant resources and expense.

SUMMARY OF THE INVENTION

An emulation module configured to model a logical behavior of an industrial control device may be stored or embedded in the industrial control device for subsequent downloading and emulation by another device. The industrial control device storing the emulation module may execute firmware for its operation, and the stored emulation module may be used to model the logical behavior of the industrial control device executing the firmware. The industrial control device storing the emulation module may provide the emulation module to another device using an industry standard bi-directional communication interface, such as an EtherNet/IP control network interface. The industrial control device may also store multiple emulation modules with identifiable revisions, and a revision of an emulation module may correspond to a revision of firmware for execution by the industrial control device.

Multiple devices in an industrial control system may provide respective emulation modules to a host system, which host system may also be one of the devices in the industrial control system or a separate workstation. The host system, in turn, may execute the emulation modules in an emulation environment and may compare one or more parameters, such as counters, timers, variables and/or instructions, to one or more parameters generated by an actual industrial control system executing a controlled process. The host system may also advance execution of the emulation modules to provide an output predicting an action of the actual industrial control system in order to predict a possible undesirable outcome or failure for taking alternative measures.

Accordingly, industrial control hardware components may include an emulation model or image of the physical component. Users may have the ability to extract the emulation model using an industry standard common application interface. The embedded emulation model may be an object of the firmware of the hardware based industrial control component. The emulation model may be locked to the firmware features hosting the emulation model. As a result, emulation in a virtual environment may be effectively maintained while an industrial control system is implemented in a physical environment.

Additional aspects of the invention are further described in co-pending, U.S. application Ser. No. 15/001,460, titled "Emulated Industrial Control Execution Rate Scale," filed on the same date as the instant application, which document is incorporated herein by reference in its entirety.

Specifically then, one aspect of the present invention may provide a device for use in an industrial control system including: a controller; a communication interface in communication with the controller, the communication interface being operable to communicate over a physical medium; firmware stored in a non-transient computer readable medium in communication with the controller, wherein the controller is configured to execute the firmware for operation of the device; and an emulation module stored in a non-transient computer readable medium in communication with the controller. The emulation module may be configured to model a logical behavior of the controller executing the firmware version when the emulation module is executed. The controller may be configured to transfer the emulation module via the communication interface.

Another aspect may provide a method for controlling a device for use in an industrial control system, the device having a controller, a communication interface in communication with the controller, the communication interface being operable to communicate over a physical medium and firmware stored in a non-transient computer readable medium in communication with the controller. The method may include: (a) executing the firmware to provide an operation of the device for interacting with the industrial control system; (b) storing an emulation module in a non-transient computer readable medium in communication with the controller, wherein the emulation module is configured to model a logical behavior of the controller executing the firmware when the emulation module is executed; and (c) transferring the emulation module over the physical medium via the communication interface.

Another aspect may provide an industrial control system including: (i) a programmable logic controller (PLC) having: (a) a processor; (b) a communication interface in communication with the processor, the communication interface being operable to communicate over a physical medium; and (c) firmware stored in a non-transient computer readable medium in communication with the processor, wherein the processor is configured to execute the firmware for operation of the PLC; and (ii) an industrial control module having: (a) a controller; (b) communication interface in communication with the controller, the communication interface being operable to communicate over a physical medium; (c) firmware stored in a non-transient computer readable medium in communication with the controller, wherein the controller is configured to execute the firmware for operation of the industrial control module; and (d) an emulation module stored in a non-transient computer readable medium in communication with the controller, wherein the emulation module is configured to model a logical behavior of the controller executing the firmware version when the emulation module is executed. The industrial control module may be connected to the PLC via the physical medium. The industrial control module may be configured to transfer the emulation module over the physical medium to the PLC.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
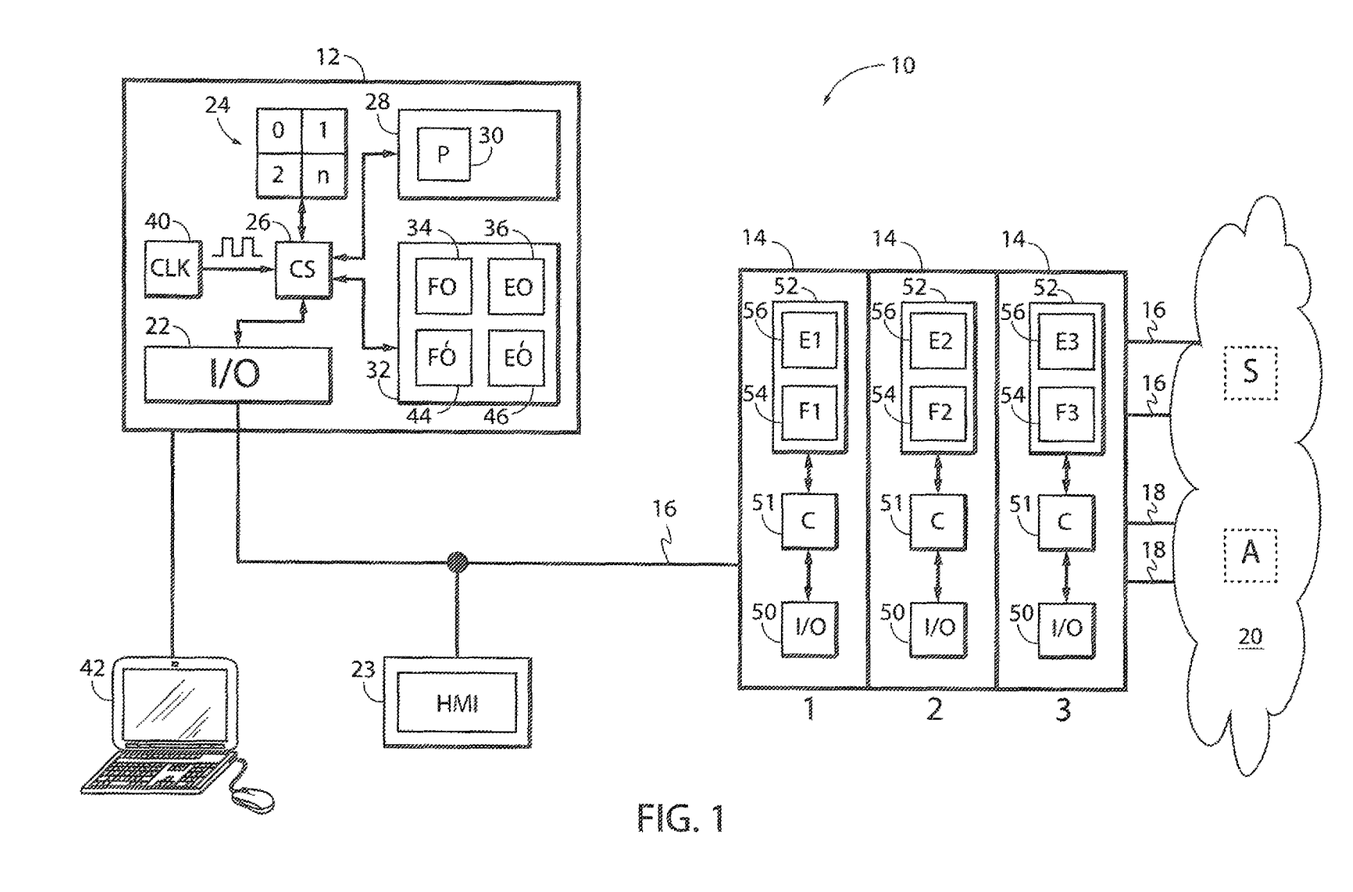
FIG. 1 is a simplified block diagram of an industrial control system in accordance with an embodiment of the invention.

Referring now to FIG. 1, an industrial control system 10 may employ various industrial control devices, such as an industrial controller 12 and one or more industrial control I/O modules 14 in communication with the industrial controller 12 over a high-speed control network 16. The industrial controller 12 may be a Programmable Logic Controller (PLC). The I/O modules 14 (denoted as modules "0," "1" and "2" in FIG. 1), as is understood in the art, may provide for input lines 17 and output lines 18 to industrial equipment 20, the input lines 17 receiving signals from sensors (denoted as "S") associated with the industrial equipment 20 and the output lines 18 providing, signals to actuators (denoted as "A") used in the industrial equipment 20.

The industrial controller 12 may utilize a communication interface 22 to communicate over the high-speed control network 16. The industrial controller 12 may also communicate with a Human Machine Interfaces (HMI) 23 over the control network 16, which may display information about the operation of the industrial equipment 20 and its associated process. The high-speed deterministic control network 16, for example, may be a well-known bi-directional control network providing highly reliable and available real-time communication, such as such as DeviceNet, ControlNet or EtherNet/IP type networks.

The industrial controller 12 may include a multicore processor 24 (denoted with processing cores "0," "1" "2" to "n") (controller) which may execute computer readable instructions. The processor 24 may, in turn, communicate with a chipset 26 of the industrial controller 12 or similar logic for communicating with other elements of the system. In one aspect, the chipset 26 may communicate with a nontransient computer readable first memory 28 which may store a control program 30 for controlling the I/O modules 14 and/or the industrial equipment 20, and may communicate with a non-transient computer readable second memory 32 which may store a firmware module 34 (denoted as "F0") and an emulation module 36 (denoted as "E0") as will be further described. The first memory 28 could be, for example, a Dynamic Random Access Memory (DRAM), and may be in communication with a mass storage drive, and the second memory 32 could be, for example, a Flash memory. In alternative aspects, a single memory or several differing memories and types may be used.

The chipset 26 may also communicate with the communication interface 22 for communicating bi-directionally over a physical medium such as the control network 16. The chipset 26 may also receive a clock signal from a real time clock 40, such as a crystal oscillator and related circuitry in the system, for accurately synchronizing events of the industrial controller 12. The industrial controller 12 may also communicate with a workstation 42 or standard programming terminal that may accept user commands, for example, using a keyboard and mouse, and output data, for example depictions of the actual control system and/or emulation of the control system, by a graphics monitor.

The firmware module 34 may be executed by the processor 24 for controlling a logical behavior of the industrial controller 12. The emulation module 36 may be used for modeling a logical behavior of the industrial controller 12 executing the firmware module 34 when executed in an "emulation environment" (or "program environment"). A different firmware module 44 (denoted as "F0'"), which could be an older and/or alternative version to the firmware module 34, and a different emulation module 46 (denoted as "E0'"), which could be older or alternative versions to the firmware module 34 and the emulation module 36, respectively, may also be stored in the second memory 32 or another memory. The emulation module 36 may correspond to the firmware module 34, and the different emulation module 46 may correspond to, the different firmware module 44, for example, according to having common revision designators between the respective firmware and emulation modules.

The I/O modules 14 may each include a module communication interface 50 for communicating over a physical medium such as the control network 16. The module communication interface 50 may further allow communication with the industrial equipment 20 via the input lines 17 and the output lines 18. The I/O modules 14 may also include a module controller 51, such a processor, microcontroller or other embedded logic, in communication with the module communication interface 50 and a module memory 53. The module memory 53 may store a firmware module 54, which may be executed by the module controller 51 for controlling a logical behavior of the I/O module 14, and an emulation module 56, which may be used for modeling a logical behavior of the I/O module 14 executing the firmware module 54 when executed in an emulation environment.

In alternative aspects, single or differing memories of the I/O modules 14 may be used, and older and/or alternative versions of the firmware and/or emulation modules may also be stored, similarly to the industrial controller 12. In addition, sensors, actuators, and/or other industrial control devices may be similarly configured with a communication interface, a controller and a stored emulation module for use in the industrial control system 10 as desired.

The control program 30 may generally be made up of program elements such as instructions, variable names, objects and the like. By way of example, the control program 30 may be written in relay ladder language (RLL) comprised of program elements including rungs and various contacts, coils, and function blocks as are generally understood in the art. In other aspects, the control program 30 could be written, for example, in Sequential Function Charts (SEC), structured text, "C" programming, and/or any other technique known in the art.

Figure 2:
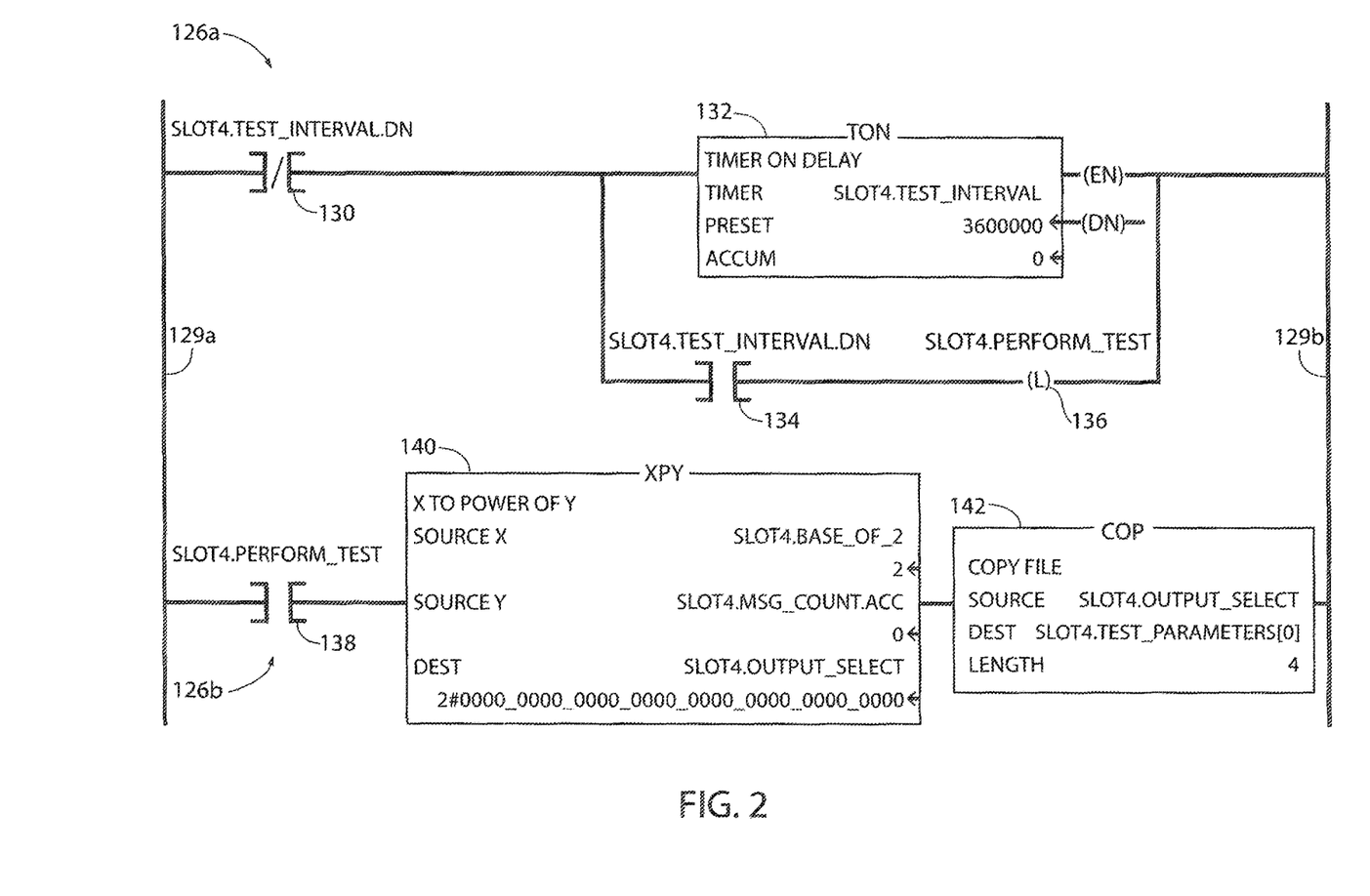
FIG. 2 is an example control program fragment of various rung elements in a relay ladder language (RLL) that may be executed by in the industrial control system of FIG. 1.

Referring momentarily to FIG. 2, by way of example, a fragment of such a control program 30 in RLL that may be executed by in the industrial control system of FIG. 1 is provided. The control program 30, depicted in conventional, graphic form, may provide for a first rung 126a and a second rung 126b one above the other and extending between a symbolic positive and ground rails 129a and 129b, respectively, in the manner of the conventional relay structure. In this example, the first rung 126a provides a normally closed (XIO) contact, element 130 which when closed may provide power to an on timer 132 (TON) and a series connected normally open contact 134 (XIC) and output coil 136 (OTE), with the latter two connected in parallel with the contact element 130. The second rung 126b provides a normally open contact 138 (XIC) in series with an arithmetic exponentiation block 140 (XPY) and a copy file block 142 (COP).

Figure 3:
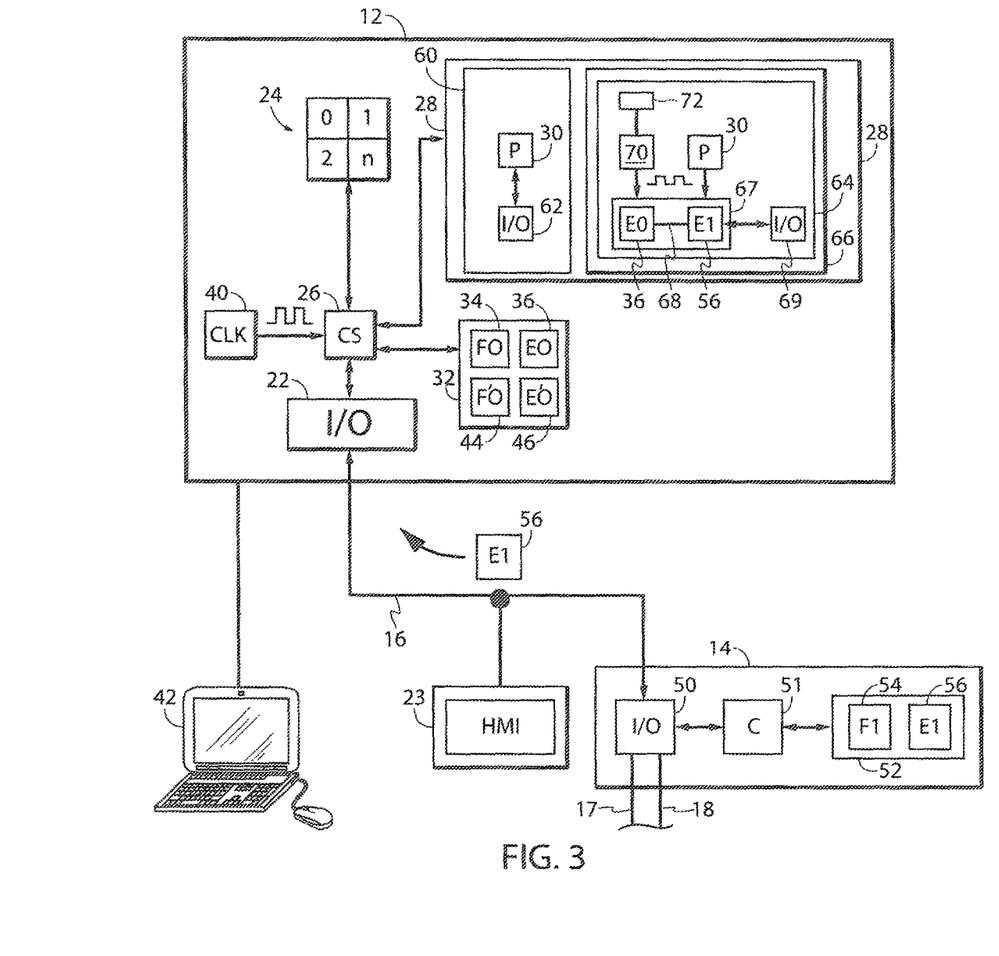
FIG. 3 is a simplified block diagram of an industrial controller receiving an emulation module from another industrial control device with the industrial controller also hosting an emulation environment in accordance with an embodiment of the invention.

Referring now to FIG. 3, a simplified block diagram of the industrial controller 12 receiving an emulation module from another industrial control device, with the industrial controller 12 also hosting an emulation environment, is provided in accordance with an embodiment of the invention. An industrial control device, such as an I/O module 14, may transfer a stored emulation module, such as the emulation module 56, via the industrial control device's communication interface to another industrial control device, in this case to the industrial controller 12. The emulation module 56 may be transferred over the control network 16 (or other industry standard communication interface) between the devices in accordance with network protocol. The I/O module 14 may transfer the emulation module 56 to another industrial control device while executing the firmware module 54 for operation of the device and while communicating with the industrial equipment 20 to control an industrial or automation process.

The industrial controller 12 may execute the control program 30, such as via core 0 of the processor 24 executing the control program 30 in a control operating system running in a first area 60 of the first memory 28. Accordingly, the control program 30 may load/store control data 62 in the first area 60 for controlling the I/O module 14 and, in turn, the industrial equipment 20. The control data 62 may include counters, timers, variables and/or instructions generated by actual control of the industrial equipment 20.

Meanwhile, the industrial controller 12, also hosting the system emulation, may further execute to build an emulation environment 64 (or program environment for emulation), such as via core 1 of the processor 24 executing to build the emulation environment 64 in a second operating system running in a second area 66 of the first memory 28. The industrial controller 12 may receive the emulation module 56 from the I/O module 14 and may run the emulation module 56 with its own emulation module 36, with a simulated interconnect 68 in between, as an emulation model 67 in the emulation environment 64. The industrial controller 12 may also provide a copy of the control program 30 in the emulation environment 64 for the emulation module 36 to execute, and may load/store emulated data 69 in the second area 66, analogous to the control data 62 for controlling the I/O module 14 and the industrial equipment 20. The emulated data 69 may receive inputs from the industrial equipment 20, though outputs to the emulated data 69 will typically not provide outputs to the industrial equipment 20.

The emulation environment 64 may also include a clock management module 70 in communication with a time reference 72. The clock management module 70 may be in communication with the real time clock 40 of the industrial controller 12, via layers of communication in the industrial controller 12, for receiving repeatable (periodic) ticks or events. The time reference 72 may provide an empirically derived look up table for timing execution of the emulation to match execution of the actual industrial control device and/or industrial control system 10 being modeled.

Accordingly, in one aspect, the emulation environment 64 may execute in lock step (synchronously) with control of the industrial equipment 20. As a result, a parameter, such as a count, time, variable, or instruction, updated in the control data 62 may be updated at approximately the same time as an equivalently emulated parameter being updated in the emulated data 69. This may advantageously allow for comparison of the parameters, for determining errors in the system.

In another aspect, the emulation environment 64 may advance execution of the emulation environment 64 to be faster than the control of the industrial equipment 20. Accordingly, the emulation environment 64 may provide an output predicting an action (or parameter) of control of the industrial equipment 20, such as a count, time, variable or instruction expected to occur. This may advantageously allow for predicting a possible undesirable outcome or failure, which may allow taking alternative measures to prevent the undesirable outcome or failure.

In yet another aspect, the emulation module 36 (of the industrial controller 12) and the emulation module 56 (of the I/O module 14) may both be transferred to the workstation 42 and/or the HMI 23. Accordingly, the workstation 42 and/or the HMI 23 may host the aforementioned emulation environment, which environment may be in addition to, or alternative to, the emulation environment 64 of the industrial controller 12. The emulation environment 64 may be implemented on a processing core of the industrial controller 12, the workstation 42 and/or the HMI 23 using an instruction set architecture (such as an instruction set architecture suitable for a Microsoft Windows computing platform) that is different from the instruction set architecture implementing the control program 30 in the program environment (such as RLL suitable for industrial control). Accordingly, the same control program 30 used to execute on the physical controller may also be used to execute in the program environment, thereby making this aspect a true emulation and not a simulation.

Figure 4:
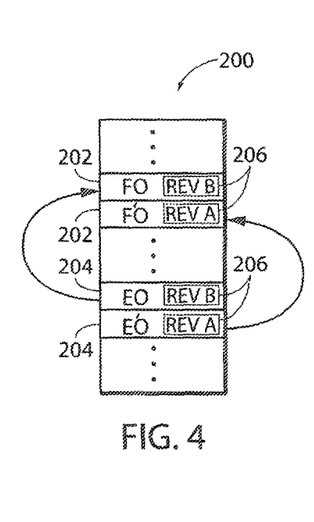
FIG. 4 is simplified block diagram of multiple firmware modules and multiple emulation modules which may be stored in an industrial control device with emulation modules corresponding to firmware modules according to revision designators in accordance with an embodiment of the invention.

Referring now to FIG. 4, a simplified block diagram of multiple firmware modules 202 and multiple emulation modules 204, which may be stored in a memory 200 of, an industrial control device, is provided in accordance with an embodiment of the invention. Some of the firmware modules 202 may represent older and/or alternative versions, and the emulation modules 204 may represent versions corresponding to the firmware modules 202. Accordingly, particular emulation modules 204 may correspond to particular firmware modules 202 according to common revision designators 206 among them.

For example, an older version of a firmware module F0' may be stored in an industrial control device with a revision designator "A." A controller, such as a processor, microcontroller or other logic, may be configured to execute the older version of the firmware module F0' for operation of the industrial control device. In addition, an older version of an emulation module E0' may also be stored in the industrial control device with a revision designator "A." Upon request, the controller may transfer the older version emulation module E0' to another device, such as via a standard I/O communication interface. When executed, the older version emulation module E0' may be used to model a logical behavior of the controller executing the older version firmware module F0'. The controller may recognize the older version emulation module E0' to correspond to the older version firmware module F0' according to the common designator "A."

Subsequently, a newer version of a firmware module F0 may be received and stored in the industrial control device with a revision designator "B." The controller may then execute the newer version firmware module F0. Also, a newer version of an emulation module E0 may be received and stored in the industrial control device with a revision designator "B." The controller may then recognize the newer version emulation module E0 to correspond to the newer version firmware module F0 according to the common revision designator "B." Accordingly, upon request, the controller may transfer the newer version emulation module E0 to another device (instead of the older version emulation module E0'), such as via the standard I/O communication interface upon request. In another aspect, the device may be configured to select one of the multiple firmware modules 202 for alternative purposes, and may provide a corresponding emulation module 204 based on the firmware module 202 that is selected.

Figure 5:
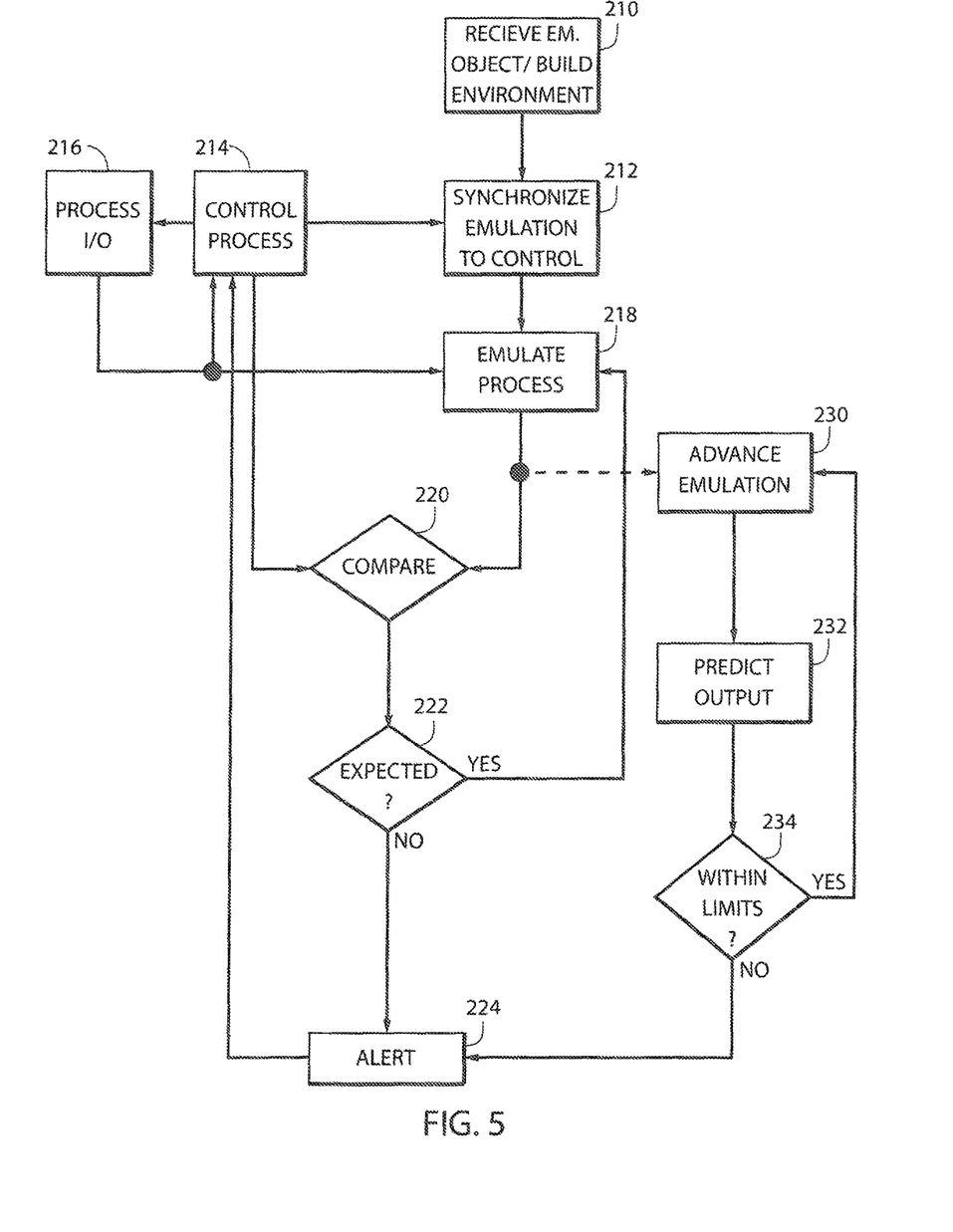
FIG. 5 is a flow chart illustrating synchronization of an emulation environment to an industrial control process for comparing parameters in real-time and/or for predicting outputs of the industrial control process in accordance with an embodiment of the invention.

Referring now to FIG. 5, a flow chart illustrating synchronization of an emulation environment to an industrial control process for comparing parameters in real-time and/or for predicting an output of the industrial control process is provided in accordance with an embodiment of the invention. In process block 210, an industrial control device or other host system, such as a workstation or HMI, receives one or more emulation modules representing one or, more industrial control devices in an actual industrial control system (block 214). The host system proceeds to build an emulation environment with the received emulation module using additional conventional libraries and modules, such as for standard interconnects, as necessary.

Next, in, block 212, the host system synchronizes the emulation environment to the actual industrial control system (block 214) executing to exchange I/O with an industrial or automation process (block 216). Synchronization in block 212 may be accomplished by matching a sequence of data and instructions in a control program of the industrial control system in block 214 with a sequence of data and instructions in a control program of the emulation environment in block 210 at a fixed, point. The industrial control system in block 214 may continue to execute in an I/O loop with the industrial or automation process in block 216 to control the automation process.

Next, after synchronization, in block 218 the host system may execute the emulation environment to emulate the actual industrial control system in block 214. In doing so, the host system may receive inputs from the actual industrial or automation process in block 216, though the host system will typically not provide outputs to the industrial or automation process in block 216.

Next, in block 220, the host system may receive a parameter from the emulation environment in block 218, such as a count, time, variable and/or instruction, and an equivalent parameter from the industrial control system in block 214, also indicating, the count, time, variable and/or instruction. The host system may compare the parameters from these sources, and in decision, block 222, the host system may determine it an expected outcome has been met (such as an exact match between the parameters, or a match between the parameters within an expected range or tolerance). If the expected outcome has not been met, in block 224, an alert may be sent to a user further investigation and/or to the industrial control system (block 214) for taking preventative measures (such as shutting down a portion or all of the industrial or automation process in block 216). However, if the expected outcome has been met, the process may return to block 218 to continue emulation of the industrial control system for another, subsequent comparison. This may continue in a looping fashion as long as the industrial control system in block 214 executes in the I/O loop with the industrial or automation process in block 216.

In another aspect, following the emulation of the industrial control system in block 218, a separate process may additionally or alternatively proceed to block 230 to advance execution of the emulation environment. Accordingly, instead of running in lock step (synchronously) with the industrial control system in block 214, the emulation environment may run faster than the industrial control system in, block 214. As a result, the emulation environment may update the parameter faster, and in block 232, the emulation environment may provide an output predicting an action (which prediction may be based on the updated parameter).

Next, in decision block 234, if the predicted output is within an expected range or tolerance, the emulation environment may return to the advanced execution in the block 230 to predict a next output for comparison (which prediction may be based on a next updated parameter). However, if the predicted output is not within an expected range or tolerance, an alert may be sent to a user further investigation and/or to the industrial control system (block 214) for taking preventative measures (such as shutting down a portion or all of the industrial or automation process in block 216).

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an" "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The controller described above may be a microprocessor, a microcontroller or other programmable logic element as known in the art. References to "a microprocessor" and "a processor" or "the microprocessor" and "the processor" can be understood to include one or more microprocessors that can communicate in a stand-alone and/or a distributed environment(s), and can thus be configured to communicate via wired, or wireless communications with other processors, where such one or more processors can be configured to operate, on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and/or can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. An industrial control device for use in an industrial control system comprising:
   a controller;
   a communication interface in communication with the controller, the communication interface being operable to communicate over a physical medium;
   firmware stored in a non-transient computer readable medium in communication with the controller, wherein the controller is configured to execute the firmware for operation of the device; and
   an emulation module stored in a non-transient computer readable medium in communication with the controller, wherein the emulation module is configured to model a logical behavior of the controller executing the firmware when the emulation module is executed, wherein the controller is configured to transfer the emulation module via the communication interface, and
   wherein the controller is configured to execute the firmware to provide control in an industrial control system while executing the emulation module to model execution of the firmware.

2. The device of claim 1, wherein the device is a programmable logic controller (PLC), and wherein the controller is a first processor of a plurality of processors of the PLC.

3. The device of claim 2, wherein the first processor is configured to execute the firmware to provide control in the industrial control system, and a second processor is configured to execute the emulation module to model the first processor.

4. The device of claim 3, wherein the second processor is configured to execute the emulation module to update a parameter in lock step with the first processor controlling the industrial control system to update the parameter.

5. The device of claim 3, wherein the second processor is configured to execute the emulation module to update a parameter faster than the first processor controls the industrial control system to update the parameter.

6. The device of claim 5, wherein the second processor is configured to execute the emulation module to provide an output predicting an action of the first processor controlling the industrial control system.

7. The device of claim 1, wherein the firmware is one of a plurality of firmware modules and the emulation module is one of a plurality of emulation modules, and wherein an emulation module corresponds to a firmware module according to a revision designator.

8. The device of claim 1, wherein the communication interface communicates bi-directionally and implements a protocol according to at least one of EtherNet/IP, DeviceNet and ControlNet.

9. The device of claim 1, wherein the firmware and the emulation module are stored in a single memory.

10. The device of claim 1, wherein the device is at least one of a sensor and an actuator.

11. A method for controlling an industrial control device for use in an industrial control system, the device having a controller, a communication interface in communication with the controller, the communication interface being operable to communicate over a physical medium, and firmware stored in a non-transient computer readable medium in communication with the controller, the method comprising:

(a) executing the firmware to provide an operation of the device for interacting with the industrial control system;

(b) storing an emulation module in a non-transient computer readable medium in communication with the controller, wherein the emulation module is configured to model a logical behavior of the controller executing the firmware when the emulation module is executed; and (c) executing the firmware to provide control in the industrial control system while executing the emulation module to model execution of the firmware.

12. The method of claim 11, wherein the firmware is one of a plurality of firmware modules and the emulation module is one of a plurality of emulation modules, and wherein an emulation module corresponds to a firmware module according to a revision designator.

13. The method of claim 11, further comprising transferring the emulation module using a protocol according to at least one of EtherNet/IP, DeviceNet and ControlNet.

14. An industrial control system comprising:

(i) a programmable logic controller (PLC) having:
(a) a processor;
(b) a communication interface in communication with the processor, the communication interface being operable to communicate over a physical medium; and
(c) firmware stored in a non-transient computer readable medium in communication with the processor, wherein the processor is configured to execute the firmware for operation of the PLC;

(ii) an industrial control module having:
(a) a controller;
(b) a communication interface in communication with the controller, the communication interface being operable to communicate over a physical medium;
(c) firmware stored in a non-transient computer readable medium in communication with the controller, wherein the controller is configured to execute the firmware for operation of the industrial control module; and
(d) an emulation module stored in a non-transient computer readable medium in communication with the controller, wherein the emulation module is configured to model a logical behavior of the controller executing the firmware when the emulation module is executed, wherein the industrial control module is connected to the PLC via the physical medium, wherein the industrial control module is configured to transfer the emulation module over the physical medium to the PLC, and wherein the processor of the PLC is configured to execute the firmware to control the industrial control module while executing the emulation module to model the industrial control module.

15. The system of claim 14, wherein the PLC further comprises an emulation module stored in a non-transient computer readable medium in communication with the processor, wherein the emulation module is configured to model a logical behavior of the processor executing the firmware when the emulation module is executed.

16. The system of claim 15, wherein the PLC receives the emulation module from the industrial control module, and the PLC executes the emulation module from the industrial control module with the emulation module stored in the PLC.

17. The system of claim 15, wherein the PLC receives the emulation module from the industrial control module, and further comprising a workstation connected to the PLC, wherein the workstation receives and executes the emulation modules from the industrial control module and the PLC.

18. The system of claim 15, wherein the processor is a first processor of a plurality of processors, and wherein the first processor is configured to execute the firmware to provide control in the industrial control system, and a second processor is configured to execute the emulation module from the industrial control module with the emulation module stored in the PLC.

19. The system of claim 18, wherein the second processor is configured to execute the emulation modules to update a parameter in lock step with the first processor controlling the industrial control system to update the parameter.

20. The system of claim 18, wherein the second processor is configured to execute the emulation modules to provide an output predicting an action of the first processor controlling the industrial control system.

* * * * *